July 29, 1924.

A. LAUKHUFF

CHANGE SPEED GEARING

Filed March 30, 1922

3 Sheets-Sheet 1

1,502,787

INVENTOR:
Alfred Laukhuff,
BY
ATTORNEYS.

July 29, 1924.

A. LAUKHUFF

CHANGE SPEED GEARING

Filed March 30, 1922    3 Sheets-Sheet 2

1,502,787

INVENTOR:
Alfred Laukhuff,
BY
Bottum, Hudnall, Lecher & Mihawara
ATTORNEYS.

July 29, 1924.

1,502,787

A. LAUKHUFF

CHANGE SPEED GEARING

Filed March 30, 1922  3 Sheets-Sheet 3

INVENTOR:
Alfred Laukhuff,
BY
Bottum, Hudnall, Liehn & McNamara
ATTORNEYS.

Patented July 29, 1924.

1,502,787

UNITED STATES PATENT OFFICE.

ALFRED LAUKHUFF, OF SHOREWOOD, WISCONSIN.

CHANGE-SPEED GEARING.

Application filed March 30, 1922. Serial No. 547,997.

*To all whom it may concern:*

Be it known that I, ALFRED LAUKHUFF, a citizen of the United States, residing at Shorewood, in the county of Milwaukee and State of Wisconsin, have invented certain new and useful Improvements in Change-Speed Gearing, of which the following is a specification, reference being had to the accompanying drawing, forming a part thereof.

This invention relates to gearing in which rotary movement is transmitted from one member to another in axial alignment therewith at a different rate of speed.

The main objects of the invention are to provide simple, efficient, compact, durable and substantially symmetrical transmission gearing of this class, in which the strains and stresses to which it is subjected shall be evenly distributed; to provide for reversing the direction of rotation of the driven member relative to that of the driving member; and generally to improve the construction and operation of change-speed transmission gearing.

It consists in the construction, arrangement and combination of parts as hereinafter particularly described and pointed out in the claims.

In the accompanying drawing like characters designate the same parts in the several figures.

Figure 1:
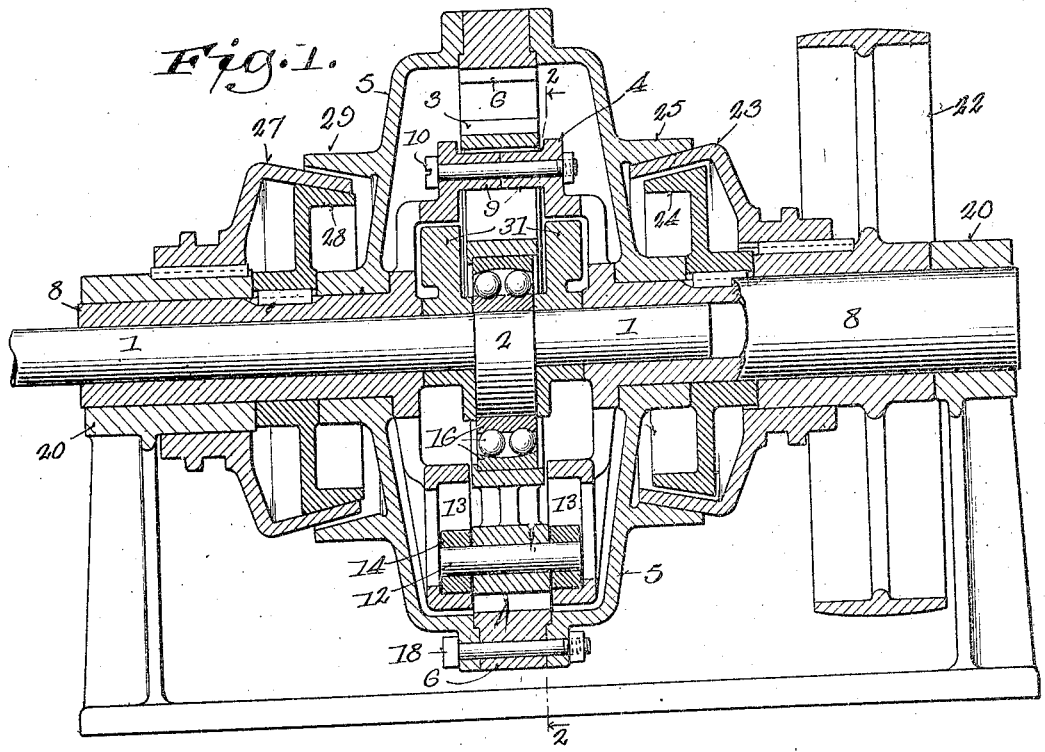
Figure 2:
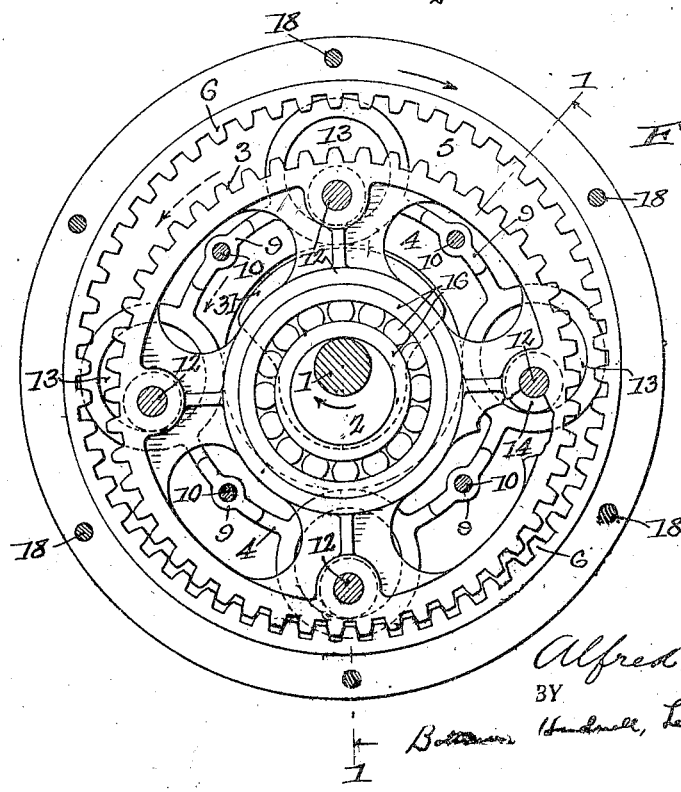
Figure 3:
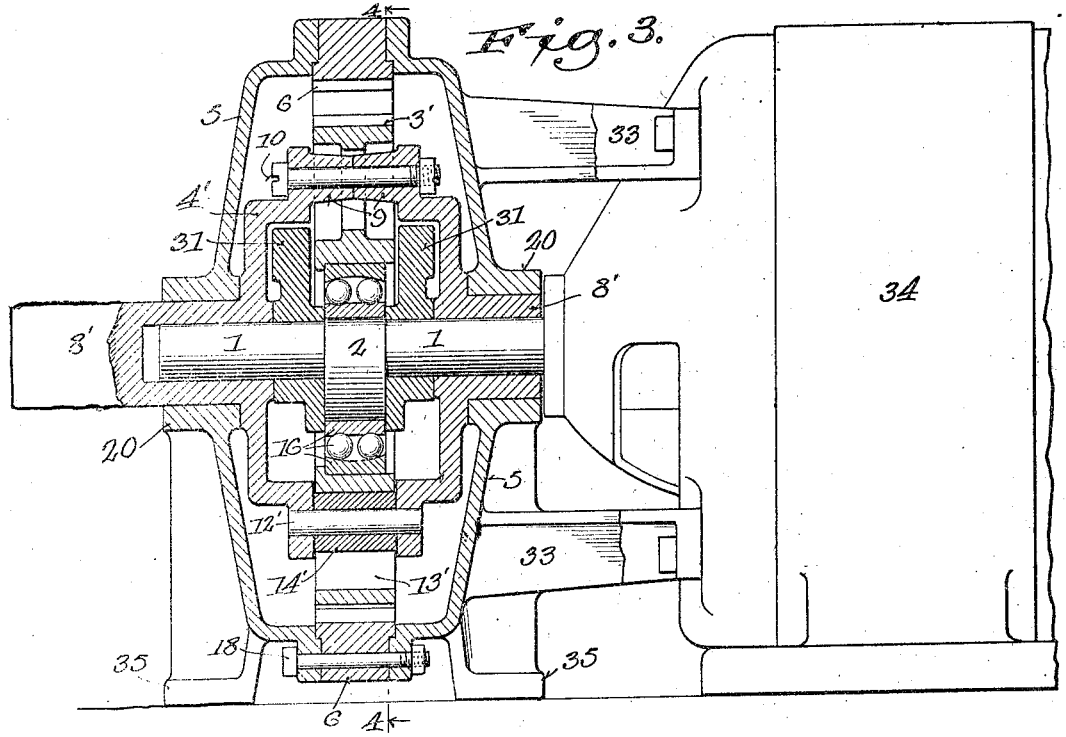
Figure 4:
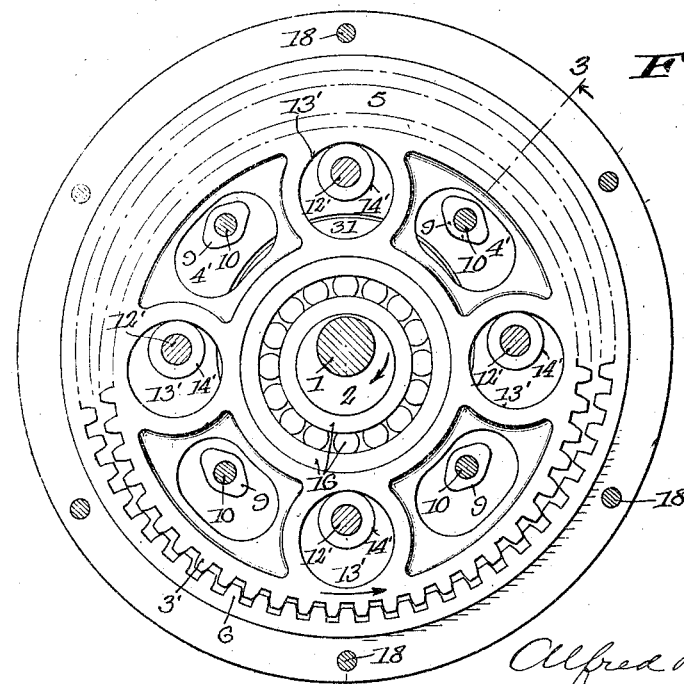
Figure 5:
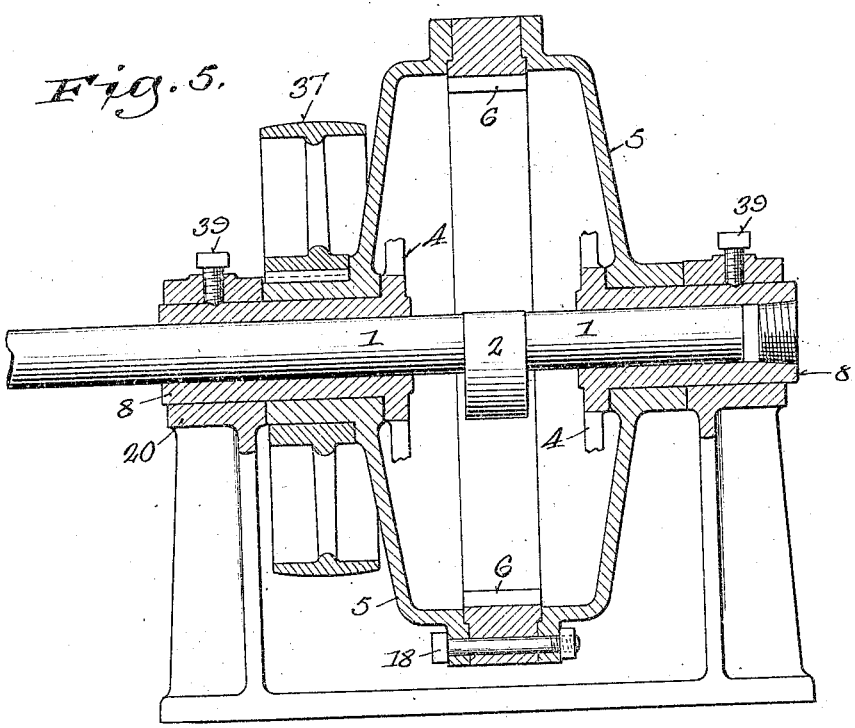

Figure 1 is an axial section on the line 1—1, Fig. 2, of reversible change-speed gearing embodying the invention; Fig. 2 is a cross section thereof on the line 2—2, Fig. 1; Fig. 3 is an axial section on the line 3—3, Fig. 4, similar to Fig. 1, showing a modification of the gearing; Fig. 4 is a cross section on the line 4—4, Fig. 3; and Fig. 5 is a fragmentary axial section similar to Figs. 1 and 3, of another modification.

Referring to Figs. 1 and 2, the gearing comprises in one of its preferred embodiments, an eccentric shaft 1, provided with an eccentric 2, a gyratory gear 3, mounted on the eccentric 2, a spider or guide member 4, and a housing or case 5, provided with an internal gear 6, surrounding and meshing with the gear 3.

The spider or guide member 4 is composed of two preferably like or similar sections formed or provided on opposite sides of the eccentric 2 and gear 3 with axially aligned hollow shafts and journal bearings 8, in which the shaft 1 is journaled and supported at opposite sides of the eccentric 2, as shown in Fig. 1.

The sections of the spider or member 4 are formed or provided with spacing lugs 9, extending into and meeting in openings formed in the gear 3 and rigidly connected with each other by bolts 10. The sections of the spider or guide member are also connected with each other and with the gear 3 by pins 12, secured in one member parallel with the shaft 1 and projecting through or into circular guide openings 13 in the other member.

In the present case, pins 12 are secured in the gear 3 and project therefrom at the ends into circular guide openings 13 formed in the spider or guide member 4, the ends of the pins being provided with anti-friction rollers 14 and the radius of the circular openings less the radius of the rollers being equal to or corresponding with the eccentricity or throw of the eccentric 2, so as to confine or hold every part of the gear 3 to a gyratory circuit corresponding with the throw of the eccentric.

To reduce friction, ball or roller bearings 16 are preferably introduced between the eccentric 2 and gear 3.

The housing or case 5 is composed of two preferably like or symmetrical sections 5, formed with axially aligned hubs which are rotatably mounted on the hollow shafts or bearings 8, and the internal gear 6 is fastened between the sections of the housing or case by bolts 18 and carried thereby concentric or coaxial with the shaft 1, in mesh with the gyratory gear 3.

The hollow shafts and bearings 8 are journaled and supported in stationary bearings 20, coaxial with the eccentric shaft 1.

For reversing the direction of rotation, the gearing is provided with an extra transmission member such as a pulley 22, loosely mounted on one of the shafts or bearings 8, as shown in Fig. 1, and provided with an axially shiftable clutch member 23, having internal and external conical faces adapted to cooperate with corresponding faces of clutch members 24 and 25, for operatively connecting the pulley or transmission member 22 with either the spider or guide member 4, or the case 5 and internal gear 6.

The clutch member 24 is keyed or fixed on the shaft or bearing 8 between the pulley or member 22 and the hub of the case 5, and the member 25 is formed on or attached to the adjacent side of the case. On the opposite side of the case 5 an axially shiftable clutch member 27, feathered or otherwise non-rotatably mounted on a stationary part of the gearing, such as the adjacent main bearing 20, is adapted by engagement with conical clutch members 28 and 29 fixed on the adjacent shaft or bearing 8 and the adjacent side of the case 5, to lock and hold either the spider or guide member 4 or the case 5 with the internal gear 6, against rotation.

The clutch members 23 and 27 are preferably connected and operated by any suitable means (not shown), so that when the member 23 is shifted out of engagement with the member 24 into engagement with the member 25 at one side of the case 5, the member 27 will be simultaneously shifted out of engagement with the member 29 into engagement with the member 28 at the opposite side of the case, as shown in Fig. 1, thereby locking the guide member 4 against rotation and operatively connecting the pulley or transmission member 22 through the case 5 with the internal gear 6.

Under these conditions, the pulley or transmission member 22, assuming it to be the driven member of the gearing, will be rotated with the case 5 and internal gear 6 at a reduced speed from the eccentric shaft 1, and in the same direction, as indicated by full line arrows, Fig. 2. By shifting the clutch members 23 and 27 in the opposite direction into engagement with the members 24 and 29 respectively, the case 5 and internal gear 6 will be locked and held against rotation and the pulley or driven member 22 will be operatively connected with the spider or guide member 4 and rotated therewith in a direction reverse to that of the eccentric shaft or driving member 1, as indicated by dotted arrows, Fig. 2. In an intermediate position of the clutch members 23 and 27, the driven member of the gearing is disconnected from the driving member.

While ordinarily the eccentric shaft 1 will be the driving member of the gearing, and either the case 5 with the internal gear 6, rotated in the same direction, or the spider or guide member 4 rotated in the opposite direction therefrom, will operate as the driven member for the transmission of rotary motion at a reduced speed, the connections may be reversed, so that the eccentric shaft will operate as the driven member to transmit rotary motion at an increased speed.

The eccentric 2 and gyratory gear 3 may be counterbalanced so that the gearing will run truly and evenly, by counterweights 31, fixed on the shaft 1 at opposite sides of the eccentric.

Referring to Figs 3 and 4, showing a modification of the gearing in which the case 5 and internal gear 6 are permanently anchored and held against rotation, as by arms or brackets cast on or attached to one section of the case and bolted to a motor case 34, or by legs or feet 35, cast on or attached to the sections of the case, or by both, the eccentric shaft, which is the driving member of the gearing, is shown as an extension of or attached to the armature shaft of the motor, and power is taken off at a reduced speed from the extended shaft or bearing 8' of the spider or guide member 4' on the opposite side of the case from the motor. With this arrangement the rotary movement of the driven member is not reversible, and the guide pins 12', which are secured at the ends in the sections of the spider or guide member 4', and are provided with anti-friction rollers 14' within circular guide openings 13' in the gyratory gear 3', may serve also to tie or fasten the sections of the member 4' together, and the bolts 10 may be dispensed with. In other respects, the gearing is substantially the same in construction and operation as that shown in Figs. 1 and 2.

Referring to Fig. 5, showing another modification of the gearing in which the spider or guide member 4 is permanently anchored and held against rotation, the eccentric shaft 1 and eccentric 2 constitute the driving member, and rotary motion is taken off from the gearing at a reduced speed from the case 5 or internal gear 6, which may serve itself as a pulley, or from a pulley 37 or gear, keyed or fastened on one of the hubs of the case. With this arrangement the hollow shafts 8 of the spider or guide member 4 are fastened in the main or stationary bearings 20 by set screws 39 or otherwise. In other respects this arrangement of the gearing is substantially the same in construction and operation as that shown by the other figures of the drawing.

With any of the embodiments of the gearing shown and described either the arrangement of the guide pins 12 and circular guide openings 13 shown in Figs. 1 and 2, or the arrangement of guide pins 12' and circular guide openings 13' shown in Figs. 3 and 4, may be used.

In each of the arrangements shown the sections of the spider or guide member 4 or 4' located on opposite sides of and connected with each other through the interposed gyratory gear 3 or 3' by bolts 10 or by pins 12', serve to confine and guide said gear in a plane perpendicular to the axis of the eccentric shaft.

Various changes in the details of construction and arrangement of parts of the gearing other than those specifically illustrated and described may be made without departure from the principle and scope of the invention as defined in the following claims.

I claim:

1. In change-speed gearing the combination of a shaft provided with an eccentric, a gyratory gear mounted on the eccentric, an internal gear supported concentrically with said shaft in mesh with the gyratory gear, a guide member composed of sections supported on opposite sides of the gyratory gear concentrically with said shaft and rigidly connected with each other by bolts passing through spacing lugs within openings in and clear of the gyratory gear, and guide pins fastened in one member and extending freely into circular guide openings in the other.

2. In change-speed gearing the combination of a shaft provided with an eccentric, a gyratory gear mounted on the eccentric, an internal gear supported concentrically with said shaft on opposite sides of and in mesh with the gyratory gear, a guide member composed of sections supported concentrically with said shaft on opposite sides of the gyratory gear and provided with spacing lugs extending through openings in the intervening gyratory gear clear thereof, bolts passing through said sections and lugs and rigidly connecting the sections with each other, and connections between the guide member and gyratory gear consisting of pins fastened to one and provided with rollers within circular openings of larger diameter in the other.

3. In change-speed gearing the combination of a shaft provided with an eccentric, a gyratory gear mounted on the eccentric, a guide member composed of sections located and supported on opposite sides of the eccentric coaxial with the eccentric shaft and rigidly secured to each other by bolts passing through openings in said gear, an internal gear supported concentrically with the eccentric shaft in mesh with the gyratory gear, and guide pins and circular guide openings loosely connecting the guide member and gyratory gear, the pins being secured in one member and the radius of the guide openings in the other member into which the pins pass less the radius of the pins, corresponding with the throw of the eccentric.

4. In change-speed gearing the combination of a shaft provided with an eccentric, a gyratory gear mounted on the eccentric, a guide member composed of sections mounted and supported on opposite sides of said gear concentric with the eccentric shaft and rigidly connected with each other by bolts passing loosely through openings in said gear, circular guide openings in one member and pins passing thereinto from the other member and holding them in a certain relation to each other, a case composed of sections located and supported on opposite sides of the guide member, and an internal gear carried by the case coaxial with the eccentric shaft in mesh with the gyratory gear.

5. In change-speed gearing the combination of an eccentric shaft provided with an eccentric, a gyratory gear mounted on the eccentric, a guide member rotatably mounted coaxially with the eccentric shaft and movably connected with said gear by pins passing from one member into circular openings in the other member, an internal gear rotatably mounted coaxially with the eccentric shaft and meshing with the gyratory gear, a rotary transmission member mounted coaxially with the eccentric shaft and internal gear, and clutches for locking either the internal gear or the guide member against rotation and for operatively connecting either of them with said rotary transmission member.

6. In change-speed gearing the combination of an eccentric shaft provided with an eccentric, a gyratory gear mounted on the eccentric, a guide member composed of sections connected together to permit gyratory movement of the gear corresponding with the throw of the eccentric and provided with axially aligned bearings in which the eccentric shaft is journaled on opposite sides of the eccentric, a case composed of sections rotatably mounted coaxially with the eccentric shaft on opposite sides of the guide member, an internal gear carried by the case coaxially with the eccentric shaft and guide member and meshing with the gyratory gear, a rotary transmission member mounted coaxially with the eccentric shaft, guide member and internal gear at one side of the case, a clutch for holding either the case with the internal gear or the guide member against rotation, and a clutch for operatively connecting the case and internal gear or the guide member with said rotary transmission member.

In witness whereof I hereto affix my signature.

ALFRED LAUKHUFF.